(12) United States Patent
Hunter

(10) Patent No.: US 10,420,710 B2
(45) Date of Patent: Sep. 24, 2019

(54) VOMIT EMISSION CONTAINMENT DEVICE

(71) Applicant: Jeremiah John Hunter, Muncy, PA (US)

(72) Inventor: Jeremiah John Hunter, Muncy, PA (US)

(*) Notice: Subject to any disclaimer, the term of this patent is extended or adjusted under 35 U.S.C. 154(b) by 0 days.

(21) Appl. No.: 15/678,088

(22) Filed: Aug. 15, 2017

(65) Prior Publication Data

US 2018/0049951 A1 Feb. 22, 2018

Related U.S. Application Data

(60) Provisional application No. 62/376,647, filed on Aug. 18, 2016.

(51) Int. Cl.
| | | |
|---|---|---|
| *A61J 19/02* | (2006.01) | |
| *F16M 13/02* | (2006.01) | |
| *F16M 11/26* | (2006.01) | |
| *B65D 33/00* | (2006.01) | |
| *A47L 13/16* | (2006.01) | |
| *A47L 13/512* | (2006.01) | |
| *F21V 33/00* | (2006.01) | |

(52) U.S. Cl.
CPC .............. *A61J 19/02* (2013.01); *A47L 13/16* (2013.01); *A47L 13/512* (2013.01); *B65D 33/004* (2013.01); *F16M 11/26* (2013.01); *F16M 13/022* (2013.01); *A61J 2200/76* (2013.01); *F16M 2200/022* (2013.01); *F21V 33/0064* (2013.01)

(58) Field of Classification Search
CPC ........ A61J 19/02; F16M 13/022; F16M 11/26
USPC ....... 248/284.1, 274.1, 276.1, 278.1, 280.11, 248/97; 108/99, 100
See application file for complete search history.

(56) References Cited

U.S. PATENT DOCUMENTS

| | | | | |
|---|---|---|---|---|
| 269,625 A | * | 12/1882 | Blake ................... | B65F 1/1415 248/98 |
| 866,463 A | * | 9/1907 | Hart ...................... | F24F 13/32 248/208 |
| 986,445 A | * | 3/1911 | Dekle .................... | A61J 9/06 248/103 |
| 2,064,671 A | * | 12/1936 | Lockaton .............. | A61J 9/0638 248/103 |
| 2,440,873 A | * | 5/1948 | Popp ..................... | F16M 11/14 248/284.1 |
| 2,543,926 A | * | 3/1951 | Mounique .............. | F21S 6/003 362/347 |
| 2,608,367 A | * | 8/1952 | Boltuch ................. | F21S 8/00 248/569 |
| 2,956,287 A | * | 10/1960 | Stanford ............... | A61G 9/006 131/241 |

(Continued)

*Primary Examiner* — Michael Safavi
(74) *Attorney, Agent, or Firm* — Bruce A. Lev

(57) ABSTRACT

A vomit emission containment device is a device having an adjustable position container stand and container designed for placement of the container in close proximity to a nauseous person. The device has a stand with a vomit container holder having an accessory holder on the back side. The vomit container holder attaches to a stand that has a base, a vertical portion, and an arm that holds the container. Each section is joined by an adjustable angle elbow that together allows the container to be positioned horizontally and vertically.

14 Claims, 5 Drawing Sheets

(56) References Cited

U.S. PATENT DOCUMENTS

| | | | | |
|---|---|---|---|---|
| 3,638,888 A * | 2/1972 | Ross | B65B 67/1205 | 248/153 |
| 3,754,771 A * | 8/1973 | Shagoury | B65B 67/1205 | 248/98 |
| 3,773,286 A * | 11/1973 | Govoni | B65B 67/12 | 248/150 |
| 3,814,359 A * | 6/1974 | Powell | B65B 67/12 | 248/215 |
| 3,820,752 A * | 6/1974 | Oram | F16M 11/046 | 248/284.1 |
| 3,861,635 A * | 1/1975 | Juris | A47G 29/1216 | 248/284.1 |
| 4,453,695 A * | 6/1984 | Sennott | A45D 20/12 | 248/278.1 |
| 4,856,740 A * | 8/1989 | MacLeod | B65B 67/1205 | 248/97 |
| 4,887,784 A * | 12/1989 | Kayali | B60N 3/102 | 248/311.2 |
| 4,917,393 A * | 4/1990 | Rogers | B62B 1/12 | 248/129 |
| 5,100,091 A * | 3/1992 | Pollak | A61G 5/10 | 248/278.1 |
| 5,108,061 A * | 4/1992 | Vlasak | F16M 11/2021 | 248/162.1 |
| 5,209,517 A * | 5/1993 | Shagoury | B62B 1/26 | 220/324 |
| 5,301,999 A * | 4/1994 | Thompson | B60N 2/26 | 248/284.1 |
| 5,445,398 A * | 8/1995 | Pierce | B62B 1/26 | 248/98 |
| 5,551,660 A * | 9/1996 | Leduchowski | F16M 11/10 | 248/276.1 |
| 5,732,920 A * | 3/1998 | Reynoso | F21V 21/26 | 248/278.1 |
| 5,853,158 A * | 12/1998 | Riggle | A47G 23/0225 | 248/311.2 |
| 6,082,552 A * | 7/2000 | Pollock | B62H 3/12 | 211/104 |
| 6,543,732 B1 * | 4/2003 | Yuan | B65B 67/1205 | 248/101 |
| 6,896,231 B1 * | 5/2005 | Sullivan, Sr. | A47G 23/0225 | 248/276.1 |
| 7,290,744 B2 * | 11/2007 | Baldasari | A63B 63/083 | 248/123.11 |
| 8,789,836 B2 * | 7/2014 | Umbro | B62B 1/042 | 280/47.26 |
| 9,109,744 B1 * | 8/2015 | Guerrero | A47G 23/02 | |
| 9,709,217 B2 * | 7/2017 | Trinh | F16M 13/022 | |
| 2002/0017595 A1 * | 2/2002 | Koyanagi | A47B 23/04 | 248/122.1 |
| 2009/0279943 A1 * | 11/2009 | Wylde | F16M 11/38 | 403/83 |
| 2011/0264061 A1 * | 10/2011 | Solomon | A61G 7/0503 | 604/318 |

\* cited by examiner

VOMIT EMISSION CONTAINMENT DEVICE

CROSS-REFERENCE TO RELATED APPLICATION

The present application is related to and claims priority from prior provisional application Ser. No. 62/376,647, filed Aug. 18, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vomit waste receptacles and more specifically relates to a vomit emission containment device.

2. Description of the Related Art

There are many illnesses that people can get that cause nausea and vomiting. Many are viral and some are bacterial. Many bacterial illnesses are caused by perishable foods that have been contaminated through contact with contaminated sources or through an unsafe temperature rise for an unsafe duration to time. Viruses on the other hand can be received from other infected humans or from animals, or through the air from known and unknown sources. Many of these illnesses cause severe vomiting, among other reactions. The vomiting itself can be a major inconvenience as sometimes there is no warning and it happens instantaneously. This is especially true with children. When this happens inside your home, there is nearly always an unpleasant cleanup involved. Sometimes keeping a vomit container close to the bed is not enough. The best case scenario is that the vomit container is able to be positioned very close to the sick individual without it being placed on the bed where it can be accidently knocked off. A solution is needed.

Various attempts have been made to solve the above-mentioned problems such as those found in U.S. Pub. No. 2011/0144600 to Shoemaker et al.; U.S. Pat. No. 8,613,256 to Stewart S. Cardon; U.S. Pat. No. 2,991,031 to Hazel E Sederquist; U.S. Pat. No. 6,554,810 to Wilk et. Al; and U.S. Pat. No. 2,471,309 to Chandler Harry L. This prior art is representative of vomit waste receptacles. None of the above inventions and patents, taken either singly or in combination, is seen to describe the invention as claimed.

Ideally, a vomit waste receptacles should provide an adjustable position receptacle holder, and, yet would operate reliably and be manufactured at a modest expense. Thus, a need exists for a reliable vomit emission containment device to avoid the above-mentioned problems.

BRIEF SUMMARY OF THE INVENTION

In view of the foregoing disadvantages inherent in the known vomit waste receptacle art, the present invention provides a novel vomit emission containment device. The general purpose of the present invention, which will be described subsequently in greater detail, is to provide a receptacle with an adjustable position receptacle holder.

A vomit emission containment device may comprise a main frame including a base portion adapted to secure the vomit emission containment device in position for use, a vertical portion adjustably attached to the base portion that is adapted to extend in a vertical direction with respect to the base portion, an arm portion having a proximal end adjustably attached to the vertical portion and a distal end, at least one adjustment member located at the proximal end and is adapted to allow the distal end to be manipulated in at least one degree of freedom with respect to the vertical portion, and a holder member attached to the distal end that is adapted to releasably hold a vomit emissions bag member at a user preferred position for use in capturing vomit emissions therein and then disposed of.

The arm portion is adapted to extend in a horizontal direction with respect to the vertical portion. The vomit emissions bag is adapted to be releasably attached to the holder member to capture vomit emissions therein. A lid member is adapted to be releasably connected to the holder member to removably cover and seal the vomit emissions bag.

The arm portion may include two arm members. The first of the two arm members is connected between the proximal end and at least one adjustment member, and the second of the two arm members is connected between the distal end and the adjustment member such that the two arm members arm adjustable with respect to one another in at least one degree of freedom. The arm portion may include three arm members and two adjustment members in some embodiments where the first of the three arm members is connected between the proximal end and a first of the two adjustment members, the second of the three arm members is connected between the first of the two adjustment members and a second of the two adjustment members, and a third of the three arm members is connected between the second of the two adjustment members and the distal end such that the three arm members are adjustable with respect to one another resulting in multiple degrees of freedom of positioning in the arm portion.

The vertical portion is preferably telescopically, releasably, and adjustably attached to the base portion via at least one releasable fastener member. The proximal end of the arm portion is telescopically, releasably, and adjustably attached to the vertical portion via a releasable fastener member. The base portion may be formed from two telescopic base members that are releasably and adjustably attached to one another via at least one releasable fastener member such that the length of the base member can be adjusted and thereby maximize the stability of the vomit emission containment device.

The lid member preferably is releasably connected to the holder member via respective interdigitating thread members. A compartment member is releasably attached to the vertical portion and is adapted to hold and store cleaning members within for cleaning the vomit emission containment device after use. There may be a glow stick holder attached to the vertical portion that is adapted to hold a glow stick member therein for use when the vomit emission containment device is being used in a dark environment.

The base portion and the vertical portion may be formed from tube-stock having a cross-section chosen from the list of cross-sections consisting of circular, square, rectangular, and triangular. The base portion and the vertical portion are formed from a material chosen from a list of materials consisting of metal, plastic, and ceramic.

The adjustment member(s) may be formed to include a frictional adjustment knob. The base portion may also include at least one attached clamp member that is adapted to allow removable attachment of the vomit emission containment device to a supporting surface. The holder member preferably includes a ring shape and the vomit emissions bag is releasably attached around a substantial portion of the perimeter of the ring shape.

The vomit emissions bag is at least partially translucent and includes indicia thereon adapted to measure the amount of vomit emissions therein. A plurality of cleaning members are adapted to be stored within the compartment member and used for cleaning the vomit emission containment device after use. The plurality of cleaning members are chosen from a group of cleaning members consisting of sanitary wipes, a bottle of cleaning fluid, paper towels, and a bottle of disinfectant fluid.

At least one glow stick is adapted to be removable placed within the glow stick holder for use when the vomit emission containment device is being used in a dark environment. A plurality of vomit emissions bags adapted to be stored within the compartment member and used to replace the vomit emissions bag releasably attached to the holder member after capturing the vomit emissions. The compartment member further comprises at least one flexible clip member on a side thereof adapted to releasably attached to the vertical portion for releasably attaching the compartment member to the vertical portion.

The present invention holds significant improvements and serves as a vomit emission containment device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vomit emission containment device constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a vomit waste receptacle and more particularly to a vomit emission containment device as used to reduce or eliminate the cleanup needed when sudden vomiting occurs.

Generally speaking, a vomit emission containment device is a device having an adjustable position container stand and container designed for placement of the container in close proximity to a nauseous person. The device has a stand with a vomit container holder having an accessory holder on the back side. The vomit container holder attaches to a stand that has a base, a vertical portion, and an arm that holds the container. Each section is joined by an adjustable angle elbow that together allows the container to be positioned horizontally and vertically.

Figure 1:
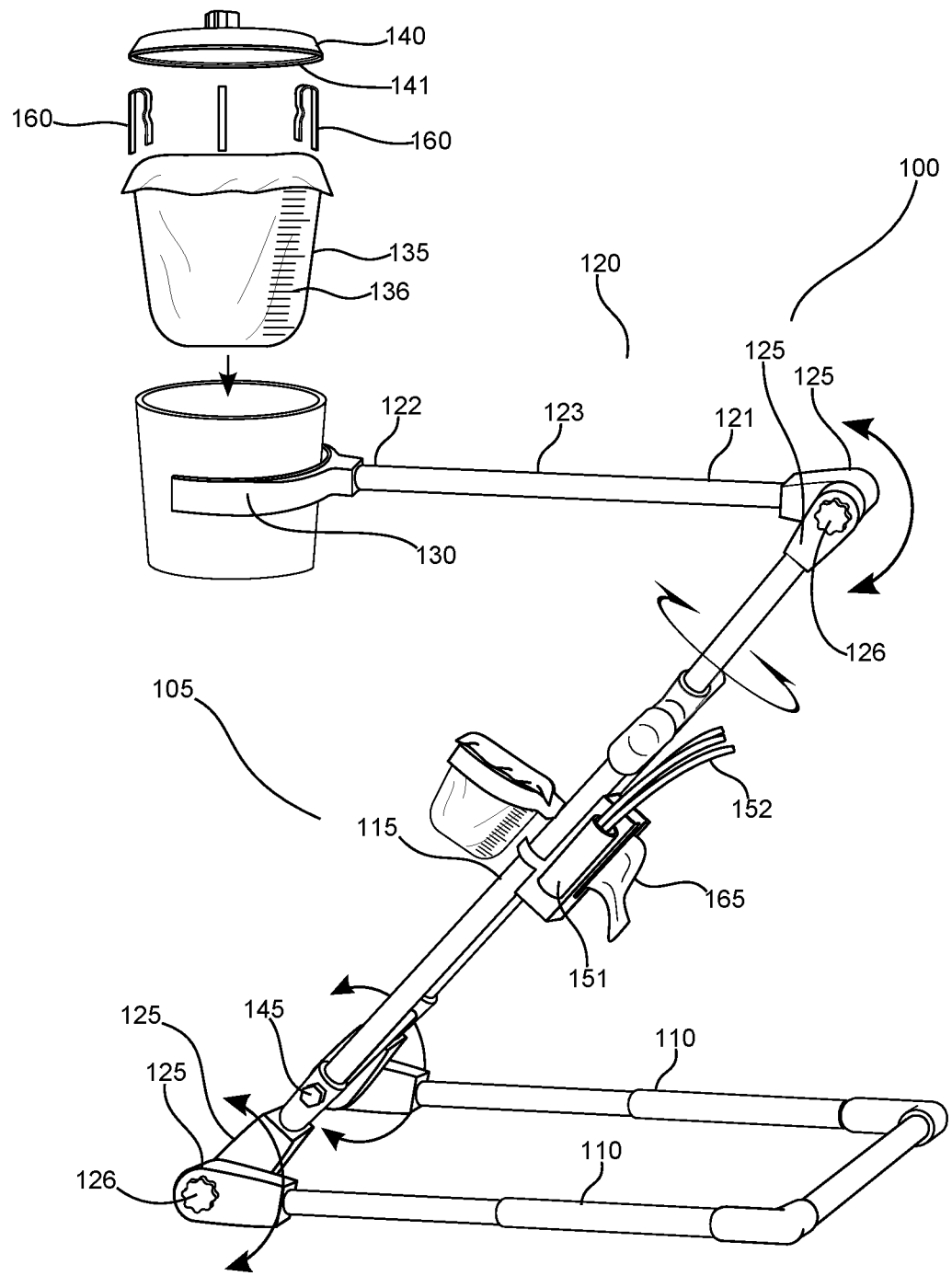
FIG. 1 shows a perspective view illustrating a vomit emission containment device according to an embodiment of the present invention.

Referring to the drawings by numerals of reference there is shown in FIG. 1, a perspective view illustrating vomit emission containment device 100 according to an embodiment of the present invention.

Vomit emission containment device 100 may comprise main frame 105 including base portion 110 adapted to secure vomit emission containment device 100 in position for use, vertical portion 115 adjustably attached to base portion 110 that is adapted to extend in a vertical direction with respect to base portion 110, arm portion 120 having proximal end 121 adjustably attached to vertical portion 115 and distal end 122, at least one adjustment member 125 located at proximal end 121 and is adapted to allow distal end 122 to be manipulated in at least one degree of freedom with respect to vertical portion 115, and holder member 130 attached to distal end 122 that is adapted to releasably hold vomit emissions bag 135 at a user preferred position for use in capturing vomit emissions therein and then disposed of. Vomit emissions bag 135 is at least partially translucent and includes indicia 136 thereon adapted to measure the amount of vomit emissions therein. Compartment member 150 is releasably attached to vertical portion 115 and is adapted to hold and store cleaning members 165 within for cleaning vomit emission containment device 100 after use.

Arm portion 120 is adapted to extend in a horizontal direction with respect to vertical portion 115. Vomit emissions bag 135 is adapted to be releasably attached to holder member 130 to capture vomit emissions therein. Lid member 140 is adapted to be releasably connected to holder member 130 to removably cover and seal vomit emissions bag 135.

Figure 2A:
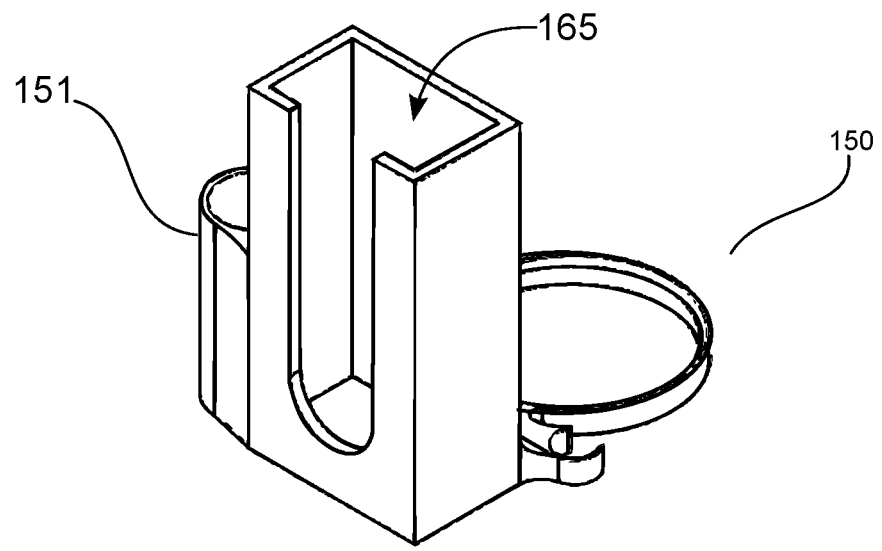
FIGS. 2A and 2B are front perspective and rear perspective views respectively illustrating a compartment member of the vomit emission containment device according to an embodiment of the present invention of FIG. 1.
Figure 2B:
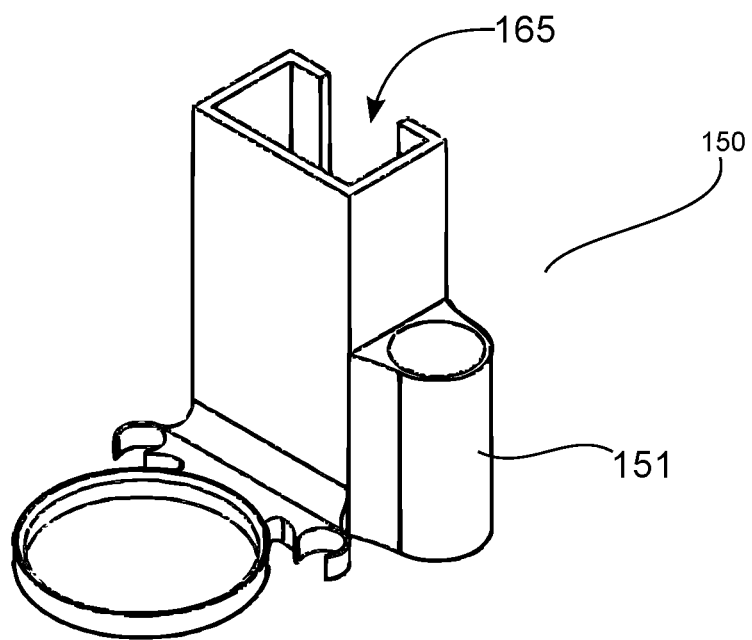

Referring now to FIGS. 2A and 2B showing front perspective and rear perspective views respectively illustrating compartment member 150 of vomit emission containment device 100 according to an embodiment of the present invention of FIG. 1.

A plurality of vomit emissions bag(s) 135 are adapted to be stored within compartment member 150 and used to replace vomit emissions bag(s) 135 releasably attached to holder member 130 after capturing the vomit emissions. Compartment member 150 further comprises at least one flexible clip member 160 on a side thereof adapted to releasably attached to vertical portion 115 for releasably attaching compartment member 150 to vertical portion 115. A plurality of cleaning members 165 are adapted to be stored within compartment member 150 and used for cleaning vomit emission containment device 100 after use. The plurality of cleaning members 165 are chosen from a group of cleaning members 165 consisting of sanitary wipes, a bottle of cleaning fluid, paper towels, and a bottle of disinfectant fluid.

Lid member 140 preferably is releasably connected to holder member 130 via respective interdigitating thread members 141. There may be glow stick holder 151 attached to vertical portion 115 that is adapted to hold glow stick member 152 therein for use when vomit emission containment device 100 is being used in a dark environment. At least one glow stick member 152 is adapted to be removable placed within glow stick holder 151 for use when vomit emission containment device 100 is being used in a dark environment.

Figure 3:
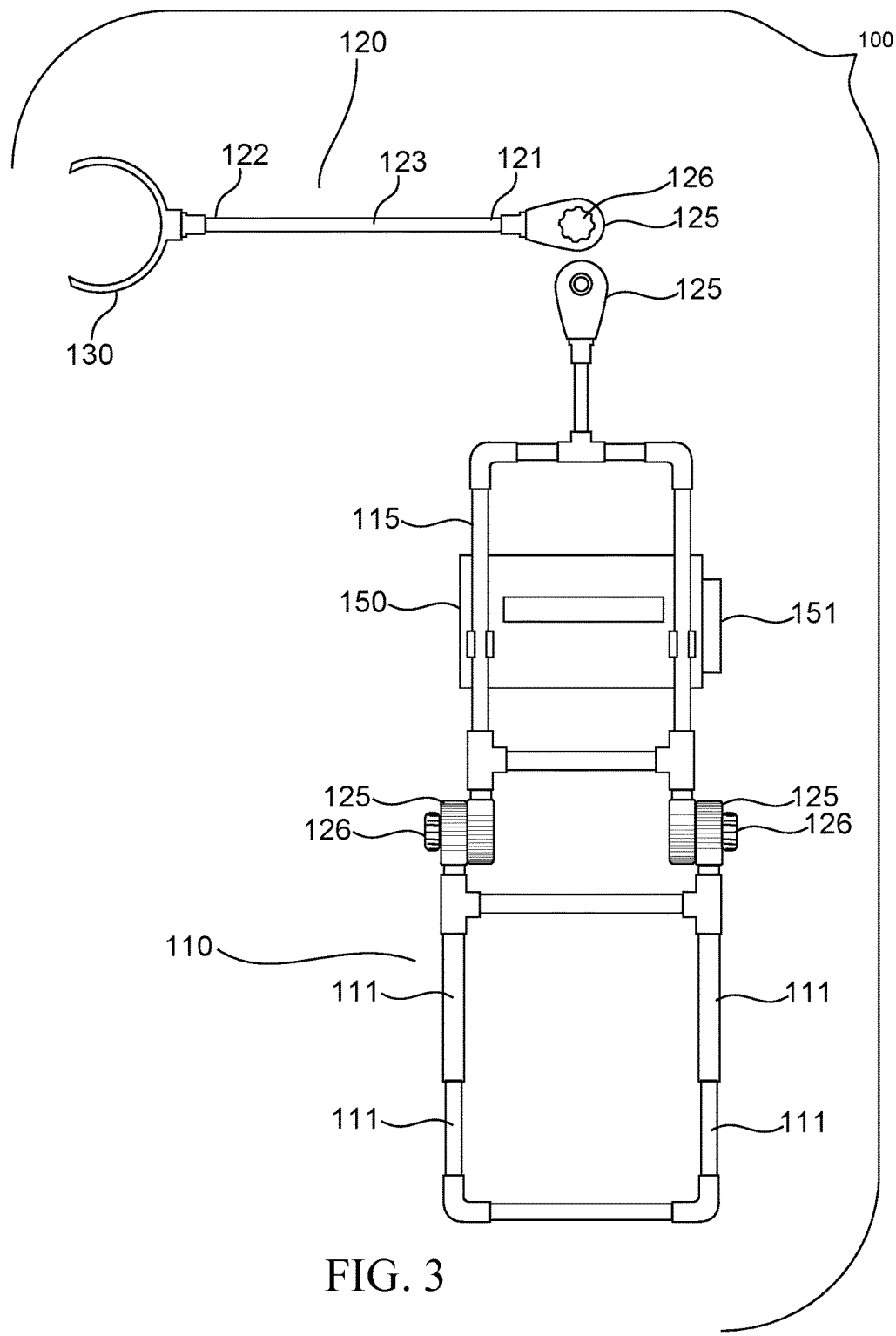
FIG. 3 is a perspective view illustrating vomit emission according to an embodiment of the present invention of FIG. 1.

Referring now to FIG. 3, is a front perspective view illustrating vomit emission containment device 100 according to an embodiment of the present invention of FIG. 1.

Arm portion 120 may include two arm portions 120. Adjustment member(s) 125 may be formed to include frictional adjustment knob 126 to tighten and lock the user preferred angle for vertical portion 115 and arm member 123. Adjustment member(s) 125 may be able to adjust throughout a range of 180 degrees so that base portion 110 can be reversed to extend telescopic base members 111 the opposite direction when, for example, it is unable to be slid under a bed or similar object to reach the user. The first of the two arm member(s) 123 is connected between proximal end 121 and at least one adjustment member(s) 125, and the second of the two arm member(s) 123 is connected between distal end 122 and adjustment member(s) 125 such that the two arm member(s) 123 are adjustable with respect to one another in at least one degree of freedom and preferably throughout 360 degrees. Arm portion 120 may include three arm member(s) 123 and two adjustment member(s) 125 in some embodiments where the first of the three arm member(s) 123 is connected between proximal end 121 and a first of the two adjustment member(s) 125, the second of the three arm member(s) 123 is connected between the first of the two adjustment member(s) 125 and a second of the two adjustment member(s) 125, and a third of the three arm member(s) 123 is connected between the second of the two adjustment member(s) 125 and distal end 122 such that the three arm member(s) 123 are adjustable with respect to one another resulting in multiple degrees of freedom of positioning in arm portion 120.

Vertical portion 115 is preferably telescopically, releasably, and adjustably attached to base portion 110 via at least one releasable fastener member 145 but may attach through a friction fit. Proximal end 121 of arm portion 120 is telescopically, releasably, and adjustably attached to vertical portion 115 via releasable fastener member 145. Base portion 110 may be formed from two telescopic base members 111 that are releasably and adjustably attached to one another via at least one releasable fastener member 145 such that the length of telescopic base members 111 can be adjusted and thereby maximize the stability of vomit emission containment device 100. Holder member 130 preferably includes a ring shape and vomit emissions bag(s) 135 is releasably attached around a substantial portion of the perimeter of the ring shape.

Base portion 110 and vertical portion 115 may be formed from tube-stock having a cross-section chosen from the list of cross-sections consisting of circular, square, rectangular, and triangular. Base portion 110 and vertical portion 115 are formed from a material chosen from a list of materials consisting of metal, plastic, and ceramic.

Figure 4A:
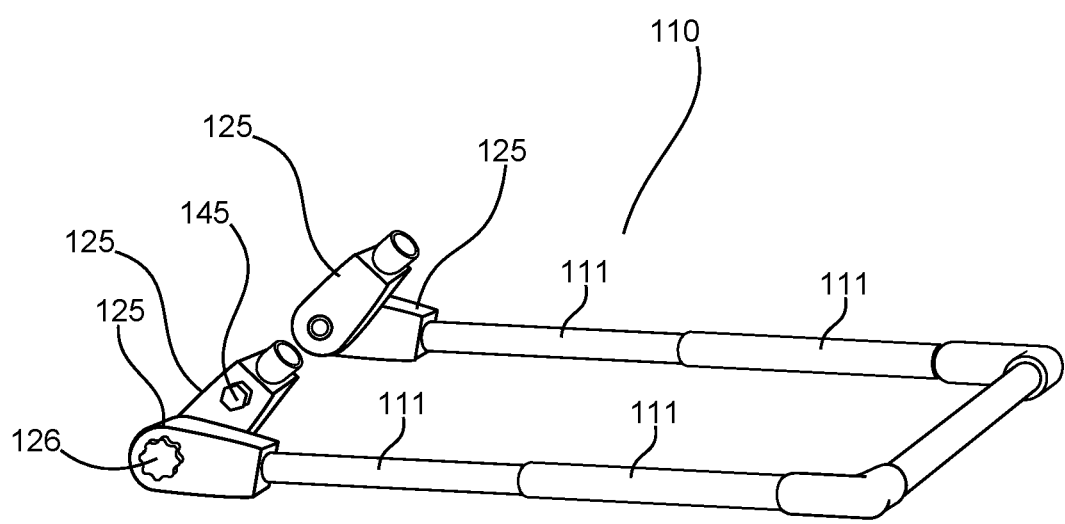
FIG. 4A is a perspective view illustrating a base portion of the vomit emission containment device according to an embodiment of the present invention of FIG. 1.

Referring now to FIG. 4A, showing a perspective view illustrating a base portion of vomit emission containment device 100 according to an embodiment of the present invention of FIG. 1.

Base portion 110 has two telescopic base members 111 for added stability, and the two base members may be telescopically adjustable in length to counter an extreme offset or reach of the arm member(s) 123. Base portion 110 attaches to adjustment member(s) 125 for adjustment of the upward angle of vertical portion 115 such that it can be leaned backward or forward in relation to adjustment member(s) 125 and telescopic base members 111.

Figure 4B:
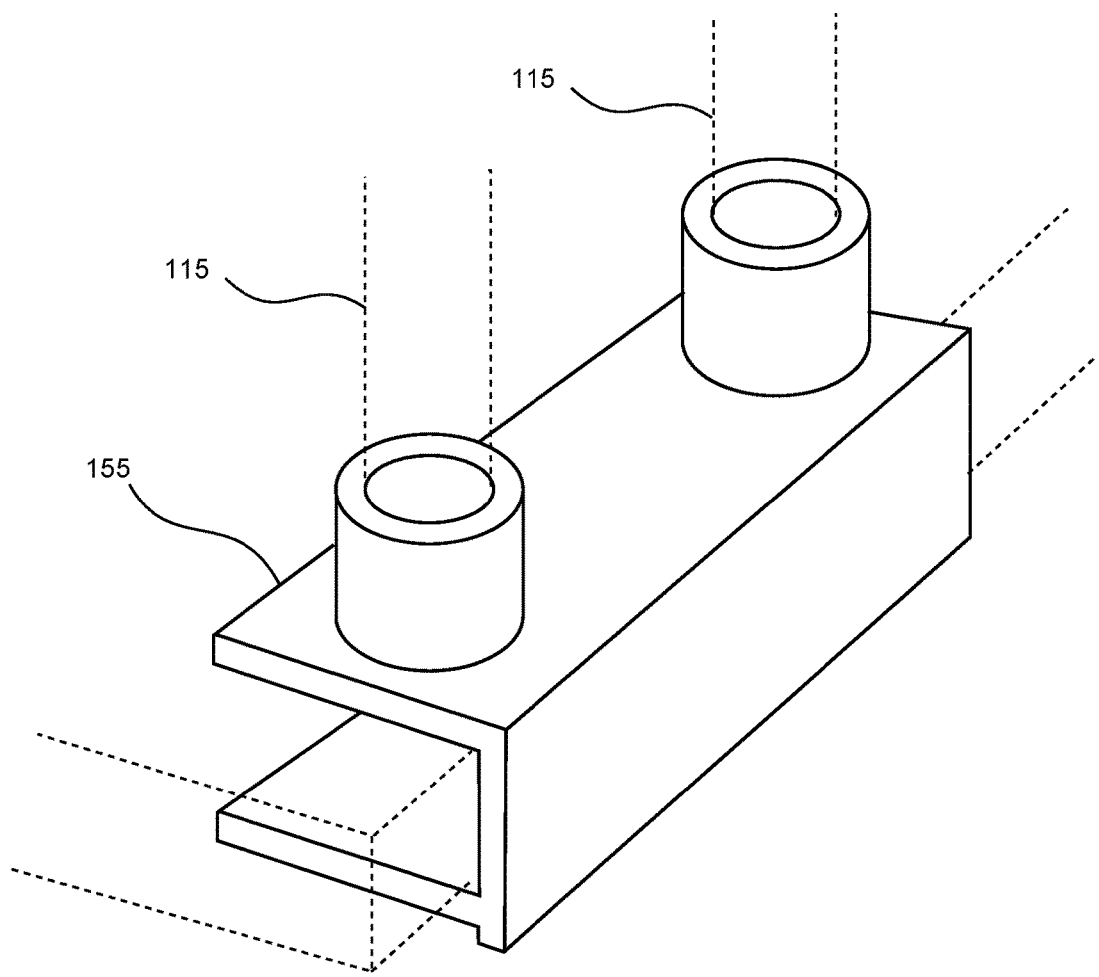
FIG. 4B is a perspective view illustrating a clamp member of the vomit emission containment device according to an embodiment of the present invention of FIG. 1.

Referring now to FIG. 4B, showing a perspective view illustrating clamp member 155 of vomit emission containment device 100 according to an embodiment of the present invention of FIG. 1.

Base portion 110 may also include at least one attached clamp member 155 that is adapted to allow removable attachment of vomit emission containment device 100 to a supporting surface such as a table top or similar structure having a horizontally extending edge of ½ inch to 2 inches. The vertical portion(s) may have a friction fit in base portion 110 or may use releasable fastener member 145 and be able to be removed and placed within similar receiver structures within clamp member 155. A fastening device of a type that may vary from embodiment to embodiment that has interdigitating threads may be used to fasten clamp member 155 to the horizontally extending edge.

Vomit emission containment device 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A vomit emission containment device comprising:
   a main frame including:
      a base portion;
         wherein said base portion is adapted to secure said vomit emission containment device in position for use;

a vertical portion;
  wherein said vertical portion is adjustably attached to said base portion and is adapted to extend in a vertical direction with respect to said base portion; and
an arm portion including;
  a proximal end;
    wherein said proximal end is adjustably attached to said vertical portion;
  a distal end;
  at least one adjustment member;
    wherein said at least one adjustment member is located at said proximal end and is adapted to allow said distal end to be manipulated in at least one degree of freedom with respect to said vertical portion; and
  a holder member;
    wherein said holder member is attached to said distal end and is adapted to releasably hold a vomit emissions bag member thereto for use in capturing vomit emissions therein for disposal purposes;
  wherein said arm portion is adapted to extend in a horizontal direction with respect to said vertical portion;
  wherein said proximal end of said arm portion is telescopically releasably and adjustably attached to said vertical portion via a releasable fastener member;
a vomit emissions bag;
  wherein said vomit emissions bag is adapted to be releasably attached to said holder member and capture vomit emissions therein; and
a lid member;
  wherein said lid member is adapted to be releasably connected to said holder member and removably cover and seal said vomit emissions bag.

2. The vomit emission containment device of claim 1, wherein said vertical portion is telescopically releasably and adjustably attached to said base portion via at least one releasable fastener member.

3. The vomit emission containment device of claim 1, further comprising a glow stick holder attached to said vertical portion and is adapted to hold a glow stick member therein for use when said vomit emission containment device is being used in a dark environment.

4. The vomit emission containment device of claim 1, wherein said base portion and said vertical portion are formed from tube-stock having a cross-section chosen from a list of cross-sections consisting of circular, square, rectangular, and triangular.

5. The vomit emission containment device of claim 1, wherein said base portion and said vertical portion are formed from a material chosen from a list of materials consisting of metal, plastic, and ceramic.

6. The vomit emission containment device of claim 1, wherein said at least one adjustment member is formed including a frictional adjustment knob.

7. The vomit emission containment device of claim 1, wherein said holder member includes a ring shape; and wherein said vomit emissions bag is releasably attached around a substantial portion of the perimeter of said ring shape.

8. The vomit emission containment device of claim 1, wherein said vomit emissions bag is at least partially translucent and includes indicia thereon adapted to measure the amount of vomit emissions therein.

9. The vomit emission containment device of claim 3, further comprising at least one glow stick adapted to be removable placed within said glow stick holder for use when said vomit emission containment device is being used in a dark environment.

10. A vomit emission containment device comprising:
a main frame including:
  a base portion;
    wherein said base portion is adapted to secure said vomit emission containment device in position for use;
  a vertical portion;
    wherein said vertical portion is adjustably attached to said base portion and is adapted to extend in a vertical direction with respect to said base portion; and
  an arm portion including;
    a proximal end;
      wherein said proximal end is adjustably attached to said vertical portion;
    a distal end;
    at least one adjustment member;
      wherein said at least one adjustment member is located at said proximal end and is adapted to allow said distal end to be manipulated in at least one degree of freedom with respect to said vertical portion; and
    a holder member;
      wherein said holder member is attached to said distal end and is adapted to releasably hold a vomit emissions bag member thereto for use in capturing vomit emissions therein for disposal purposes;
    wherein said arm portion is adapted to extend in a horizontal direction with respect to said vertical portion;
a vomit emissions bag;
  wherein said vomit emissions bag is adapted to be releasably attached to said holder member and capture vomit emissions therein; and
a lid member;
  wherein said lid member is adapted to be releasably connected to said holder member and removably cover and seal said vomit emissions bag;
  wherein said lid member is releasably connected to said holder member via respective interdigitating thread members.

11. A vomit emission containment device comprising:
a main frame including:
  a base portion;
    wherein said base portion is adapted to secure said vomit emission containment device in position for use;
  a vertical portion;
    wherein said vertical portion is adjustably attached to said base portion and is adapted to extend in a vertical direction with respect to said base portion; and
  an arm portion including;
    a proximal end;
      wherein said proximal end is adjustably attached to said vertical portion;
    a distal end;
    at least one adjustment member;
      wherein said at least one adjustment member is located at said proximal end and is adapted to allow said distal end to be manipulated in at least one degree of freedom with respect to said vertical portion; and a holder member;
wherein said holder member is attached to said distal end and is adapted to releasably hold a vomit emissions bag member thereto for use in capturing vomit emissions therein for disposal purposes;
wherein said arm portion is adapted to extend in a horizontal direction with respect to said vertical portion;

a vomit emissions bag;
wherein said vomit emissions bag is adapted to be releasably attached to said holder member and capture vomit emissions therein; and a lid member;
wherein said lid member is adapted to be releasably connected to said holder member and removably cover and seal said vomit emissions bag; and a compartment member;
wherein said compartment member is releasably attached to said vertical portion and is adapted to hold and store cleaning members therein for cleaning said vomit emission containment device after use.

12. The vomit emission containment device of claim 11, further comprising a plurality of cleaning members adapted to be stored within said compartment member and used for cleaning said vomit emission containment device after use.

13. The vomit emission containment device of claim 12, wherein said plurality of cleaning members are chosen from a group of cleaning members consisting of sanitary wipes, a bottle of cleaning fluid, paper towels, and a bottle of disinfectant fluid.

14. The vomit emission containment device of claim 11, further comprising a plurality of vomit emissions bags adapted to be stored within said compartment member and used to replace said vomit emissions bag releasably attached to said holder member after capturing said vomit emissions therein; and wherein said compartment member further comprises at least one flexible clip member on a side thereof adapted to releasably attached to said vertical portion for releasably attaching said compartment member to said vertical portion.

* * * * *